(12) United States Patent
Unger

(10) Patent No.: US 12,279,565 B2
(45) Date of Patent: Apr. 22, 2025

(54) HORTICULTURAL CARE DEVICE

(71) Applicant: Modern Day Hippy, LLC, Chandler, AZ (US)

(72) Inventor: Matthew Unger, Chandler, AZ (US)

( * ) Notice: Subject to any disclaimer, the term of this patent is extended or adjusted under 35 U.S.C. 154(b) by 91 days.

(21) Appl. No.: 18/473,222

(22) Filed: Sep. 23, 2023

(65) Prior Publication Data
US 2025/0098607 A1    Mar. 27, 2025

(51) Int. Cl.
*A47G 7/04*      (2006.01)
*A01G 31/04*     (2006.01)

(52) U.S. Cl.
CPC ............... *A01G 31/04* (2013.01); *A47G 7/04* (2013.01)

(58) Field of Classification Search
CPC .. A47G 7/04; A47G 7/041; A47G 2007/0048; A47B 2200/02
See application file for complete search history.

(56) References Cited

U.S. PATENT DOCUMENTS

| | | | | |
|---|---|---|---|---|
| 1,653,296 | A * | 12/1927 | Kremenek | A47B 11/00 108/142 |
| 3,004,571 | A * | 10/1961 | Gerbrandt | A47C 3/18 269/302 |
| 3,972,419 | A * | 8/1976 | Short | A47G 23/08 211/131.1 |
| 4,001,959 | A * | 1/1977 | Grendahl | A47G 7/041 D6/403 |
| 5,347,751 | A * | 9/1994 | Carpay | A47G 7/041 47/72 |
| 7,578,720 | B2 * | 8/2009 | Drosendahl | A47D 3/00 446/227 |
| 10,966,550 | B2 * | 4/2021 | Maddocks | A01G 9/02 |
| 2014/0083003 | A1 * | 3/2014 | Adams | A47G 7/041 47/39 |
| 2015/0245704 | A1 * | 9/2015 | Hwang | A47B 11/00 108/91 |
| 2023/0301241 | A1 * | 9/2023 | Maddocks | A01G 9/02 |
| 2024/0285104 | A1 * | 8/2024 | He | A47G 7/08 |

* cited by examiner

*Primary Examiner* — Kristen C Hayes
(74) *Attorney, Agent, or Firm* — Venjuris, P.C.; Michael Campillo

(57) ABSTRACT

A 360 degree rotatable tabletop for trimming plants or other plant care enables lateral access to all sides of a plant and incorporates removable tie-downs for spreading plant stems apart.

12 Claims, 3 Drawing Sheets

HORTICULTURAL CARE DEVICE

FIELD OF THE INVENTION

The present inventions relate to aeroponic horticultural growing devices and horticultural trimming devices.

SUMMARY OF EMBODIMENTS DISCLOSED

Aspects of the inventions disclosed herein may be used together or incorporated in a aeroponic growing enclosure, apparatus, or device or certain of the components may be used separately from the other components and adapted to alternate plant care devices or trimming devices. Accordingly, the invention(s) should not be limited to specific embodiments disclosed herein.

Aspects of the invention may be incorporated in a plant care apparatus, comprised of a tabletop with a tabletop pot aperture positioned substantially centrally to the tabletop, the tabletop comprised of a tabletop top surface and a tabletop bottom surface. A plurality of removably connectable tie-downs are distributable or distributed on the tabletop around the pot aperture and configured to enable securing plant stem thereupon or therefrom. Additional aspects include a rotation ring comprised of a ring platform and a rotation means, the ring platform adapted to encircle and contact the tabletop around the tabletop pot aperture, and the rotation means adapted for rotation of the ring platform relative to the rotation means. In use, the tabletop may be positioned on the ring platform and the rotation means positioned on a second surface and the tabletop is rotatable relative to the second surface. Additional aspects may include removably connectable tie-downs comprised of a ferromagnetic material, or alternatively, or additionally, the tabletop may include or be comprised of ferromagnetic material. Implementations may comprise a rotation means selected from wheels, bearings, slippery surfaces, or alternatively, the rotation ring may comprise a Lazy Suzan ring, a turntable, a swivel carousel or other alternative equivalent device that enables relative annular rotation between two adjacent surfaces or structures.

Additional aspects include implementations wherein the second surface is comprised of a second table with a second table pot aperture, and the rotation ring is positioned on the second table pot aperture, the tabletop pot aperture aligned with the second table pot aperture. Alternative aspects include uses of the tabletop or device with an enclosure with a top wall and an enclosure pot aperture in the top wall, the second surface comprises the top wall, the rotation ring positioned on the enclosure pot aperture, the tabletop pot aperture positioned on the enclosure pot aperture.

Aspects also include a method of caring for a plant, comprising providing a tabletop with a tabletop pot aperture, a plurality of tie-downs that are removably securable to the tabletop, and a rotation ring that encircles the tabletop pot aperture and that enables rotation of the tabletop. A plant with roots and a plurality of stems is positioned with the roots in the tabletop pot aperture, with the roots extended through the tabletop pot aperture and the stems positioned above the tabletop aperture. At least the first and second tie-downs are removably secured on the tabletop and a line, wire, or other tie is securable between a first stem and the first tie-down. The tabletop may then be rotated, and a second line secured between a second stem and the second tie-down.

Aspect may be implemented in a plant care device comprised of a ring with a substantially flat surface, the ring positioned substantially horizontally to and within the surface, the ring functionally coupled to the substantially flat surface by an annular rotation device that enables annular relative rotation between the ring and the substantially flat surface, and the substantially flat surface configured to receive a plurality of tie-down-anchors. In use, a plant with roots and a plurality of stems is receivable in a net pot, and the roots and a portion of the net pot are receivable through the ring, and the plurality of stems are respectively securable to the tie-down anchors. Aspects include the annular rotation device selected from a Lazy-Susan, a carousel, and a swivel turntable. Further aspects include the substantially flat surface comprised of a ferromagnetic material, or alternatively, or additionally, the substantially flat surface is comprised of a magnetic material.

Numerous advantages and features of the present invention will become readily apparent from the following detailed description of the invention and the embodiments thereof, from the claims and from the accompanying drawings.

Figure 1:
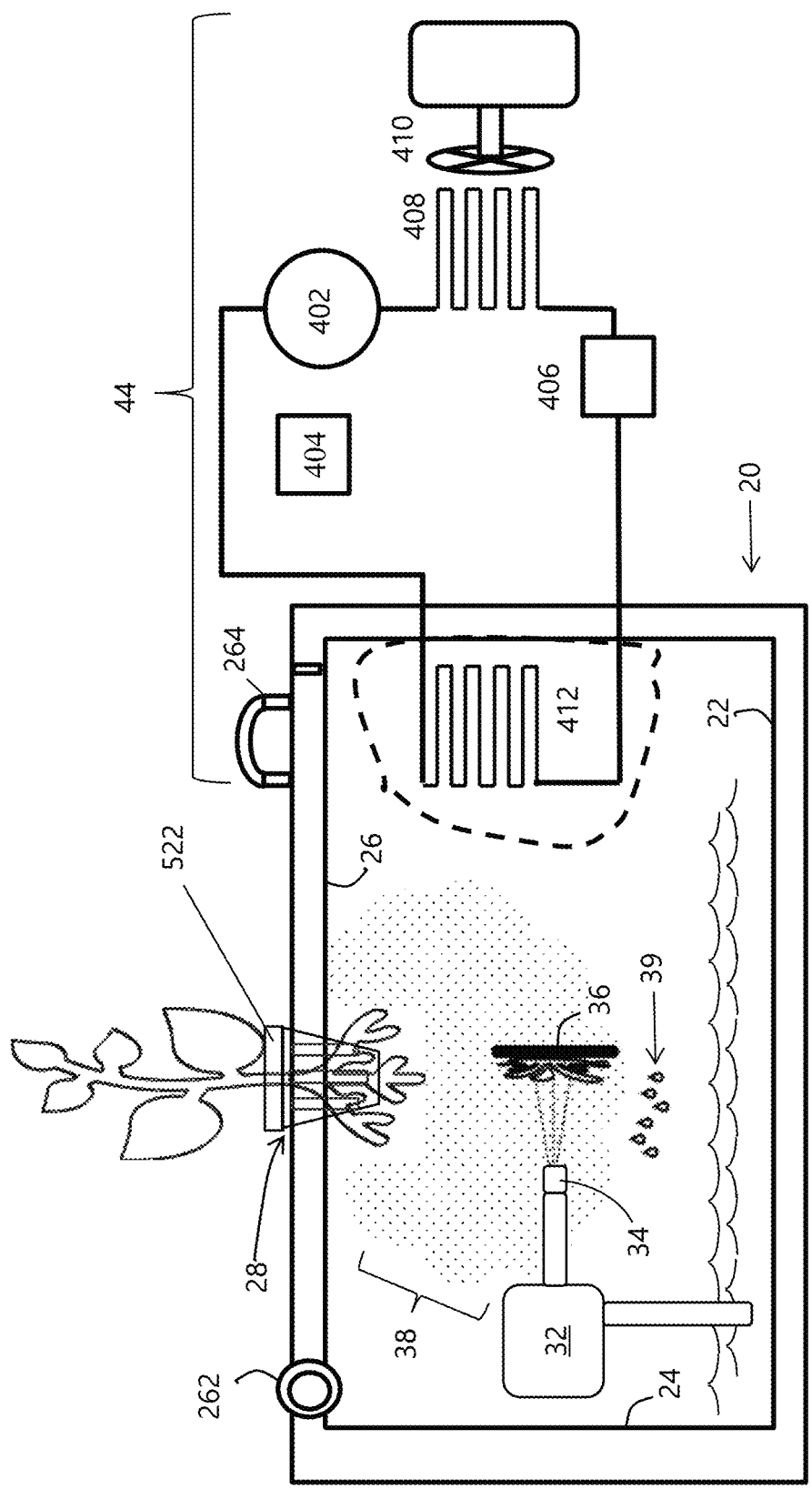
FIG. 1 illustrates use of an embodiment with an enclosure 20 functionally coupled to a Vapor Refrigeration Compression System 44 (VRCS 44) and an aeroponic droplet or mist production system positioned within the enclosure.

The objects, features and advantages of the present invention will be more readily appreciated upon reference to the following disclosure when considered in conjunction with the accompanying drawings, wherein reference numerals are used to identify the components in the various views.

DESCRIPTION OF EMBODIMENTS

Aspects of the invention comprise an enclosure functionally coupled to a vapor refrigeration compression system 44 (VRCS 44) and an aeroponic droplet or mist production system. With reference to FIG. 1, the enclosure 20 may comprise an interior volume with an inside wall boundary, the inside wall boundary comprised of bottom wall 22, side wall 24 and top wall 26. The top wall 26 of the inside wall boundary may be removably separable from the side wall 24 and include a pot aperture 28, which in the illustrated embodiment is configured to receive a standard sized net pot 522 diameter. Moreover, the pot aperture 28 is preferably positioned above a tubular shaped root-growth zone within the interior volume bounded by the inside wall boundary and above a micro droplets 38 mist produced by the aeroponic droplet or mist production system in the tubular shaped root-growth zone.

In preferred embodiments, the enclosure 20 comprises an insulated enclosure that is integrated with and functionally coupled to VRCS 44 that is temperature controllable between about 50 and 86 degrees Fahrenheit. A preferred VRCS 44 comprises a closed tubing with a refrigerant therein in functional communication with compressor 402 condenser coils 408, an expansion valve 406 and evaporator coils 412 and an evaporator fan (not pictured) functionally coupled to the interior volume (see cutout) within the inside wall boundary of the enclosure 20. A temperature controller 404 and thermostat within the enclosure 20 is enabled to maintain the temperature within the enclosure 20 as specified and at or between desired temperatures.

The aeroponic droplet or mist production system 30 is comprised of a pump 32 in liquid communication with at least output orifice and at least one substantially perpendicularly oriented surface inside the inside wall boundary, such as dispersion plate 36 as illustrated. The pump 32 and at least one output orifice produce a high-velocity or high-kinetic energy water stream that collides with the at least one substantially perpendicularly oriented surface with a sufficiently large amount of kinetic energy. The high-kinetic water stream against the surface causes the water molecules to undergo a sudden deceleration and compression whereupon the rapid change in momentum creates intense pressure and stress within the water mass, leading to its fragmentation into a range of water droplet size. These newly formed droplets then disperse in various directions within the tubular shaped root-growth zone 29. The size of water droplets created from the pump 32 and orifice create a range of droplets size due to fragmentation upon impact. Additionally, the properties of the substantially perpendicularly oriented surface inside the inside wall boundary, such as its texture and angle, influence droplet size by affecting the degree of deceleration and compression. In general, the resulting water droplets range from tiny mist-like water droplets of nanometer and micro diameter sizes that remain suspended within the tubular shaped root-growth zone 29 to be deposited onto the plant roots, to larger droplets that may be several millimeters in size that fall back to the reservoir. The combination of the aeroponic droplet or mist production system and VRCS 44 creates an optimal horticultural growing environment.

Liquid, such as water with plant food, may be stored in a reservoir in the enclosure 20 such that the pump 32 pumps water from the reservoir and circulates or exchanges the water at a rate of at least 20 times per hour and directs it through an outlet or orifice and against a dispersion plate 36 oriented substantially perpendicularly to the water stream and inside the inside wall boundary. In a first preferred embodiment, water from the pump 32 is output through an outlet with sufficient kinetic energy and against the dispersion plate 36 to produce a range of range of water droplet sizes that includes macro sized and nano droplets of water. The tubular shaped root-growth zone 29 is of sufficient distance from the substantially perpendicularly oriented surface to permit the heavier water droplets to fall back to the reservoir while allowing the smaller nano droplet sized water droplets to remain suspended in the tubular shaped root-growth zone 29 and deposit on plant roots in said zone. In one embodiment, sufficient kinetic energy was obtainable with a 800 GPH (3000 L/H) 24-Watt, submersible pump 32 functionally coupled to a plurality of spray nozzles 34 capable of between about 1.5-5 GPM, each nozzle 34 directed against a substantially perpendicularly oriented surface inside the inside wall boundary. In other embodiments, sufficient kinetic energy was achieved with at least one pump 32 capable of at least about 200 GPH and at least one spray nozzle 34 capable of at least about 1 GPM directed against a substantially perpendicularly oriented surface inside the inside wall boundary.

At least one spray nozzle 34 may be used as the output or outlet orifice to increase the kinetic energy or velocity of the water output from the pump 32 functionally coupled to plurality of spray nozzles 34 to the point where the kinetic energy or force of impact of water against the substantially perpendicularly oriented surface inside the inside wall boundary creates the range of water droplet sizes described herein. Moreover, the spray nozzle 34 is purposefully selected or designed so that it produces liquid output droplets preferably between about least 5-100 microns in diameter, but may produce droplets as large as 1 mm in diameter, to substantially reduce if not eliminate clogging of the nozzle 34. The spray nozzle 34 of the system substantially eliminates clogging by allowing desired particulate or suspended matter that may clog an atomizer output orifice, such as plant food, such as nutrients and minerals, to pass through the spray nozzle 34 output orifice, as well as allowing other unintended or undesired particulate matter, such as hard water minerals which ordinarily clogs atomizing nozzles, to pass through the spray nozzle 34. In all embodiments, the plant food, such as nutrients and minerals are suspended within the micro droplet mist created by the aeroponic droplet or mist production system 30 and exposed to the plant root structure whilst substantially eliminating clogging of the spray nozzle 34. The aeroponic droplet or mist production system 30 creates nano and micro droplets of about 500 μm in diameter (or less) by force of impact of the water against a substantially perpendicularly oriented surface inside the inside wall boundary, such as a dispersion plate 36. By aiming a high kinetic energy water source, such as one created with the pump 32 and spray nozzle 34 at and against a substantially perpendicularly oriented surface inside the inside wall boundary, the aeroponic droplet or mist production system 30 is adapted to create a range of droplet sizes, which range of droplet sizes includes a nano to micro droplet mist of droplets less than about 500 microns in diameter, and preferably between about 1 and 100 microns in diameter, that remain suspended in the air inside the tubular shaped root-growth zone 29 and deposit on plant roots, and also droplets of a larger size, or on the order of 1 mm in diameter or larger, that will drop 39 towards the reservoir within inside wall boundary. In a preferred embodiment, the substantially perpendicularly oriented surface within the inside wall boundary comprises the dispersion plate 36 positioned to receive the output from a spray nozzle 34 that may be positioned between the spray nozzle 34 and a side wall 24 of the enclosure 20. In another embodiment, the surface oriented substantially perpendicularly to the directed spray from the spray nozzle 34 may comprise the side wall 24 of the enclosure 20 but may also comprise (and as illustrated) as an alternative to or in addition to an intermediate surface(s) interposed between the side wall 24 and the spray nozzle 34. The diffusion plate 36 may further comprise a non-smooth, rough, perforated, or textured surface to enhance or further facilitate the disassembly of liquid droplets and promote the disassembly of liquid droplets from the spray nozzle 34. Additionally, in at least one preferred embodiment, an aeroponic droplet or mist production system comprises a plurality of spray nozzles 34 directed at one or more diffusion plates 36 to increase the production of micro droplets 38. In use, a plant selected from a seed, seedling, or leafy plant, is receivable in the pot aperture 28 and leafy plant growth may occur above the top wall 26 and roots from the plant grow from exposure to the micro-droplet mist within the root growth zone while the larger than micro droplet output 39 drops away from the tubular shaped root-growth zone 29.

Figure 2A:
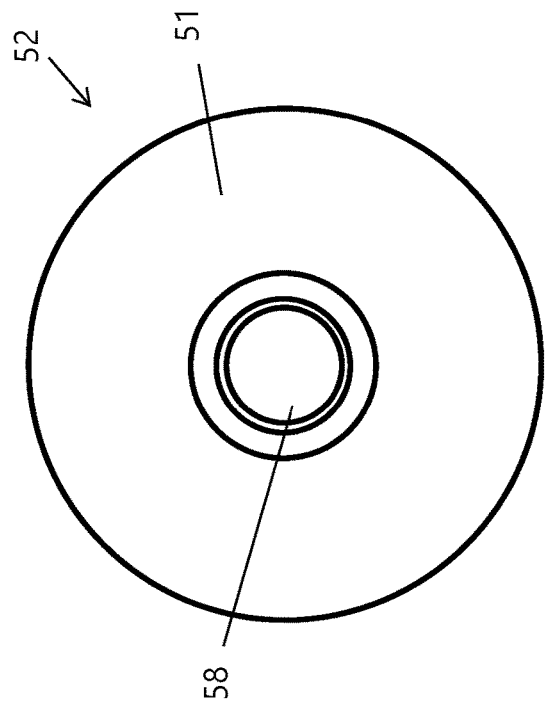
FIGS. 2A and 2B illustrate top and bottom views of the tabletop 52 embodiment.
Figure 2B:
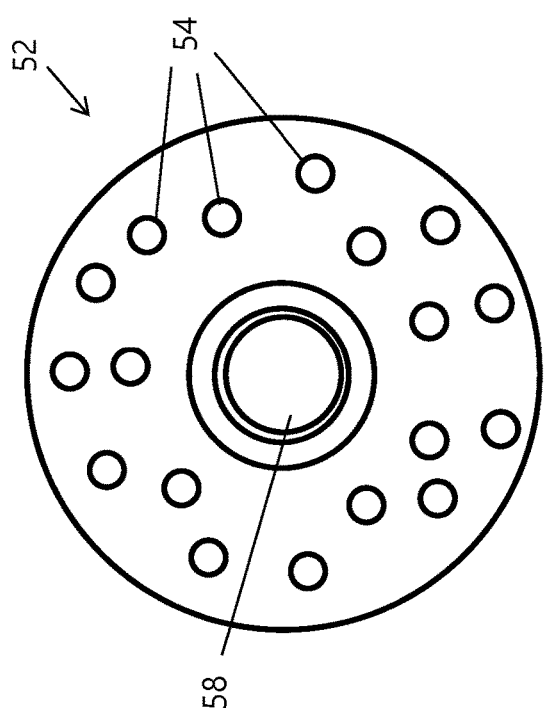
Figure 2C:
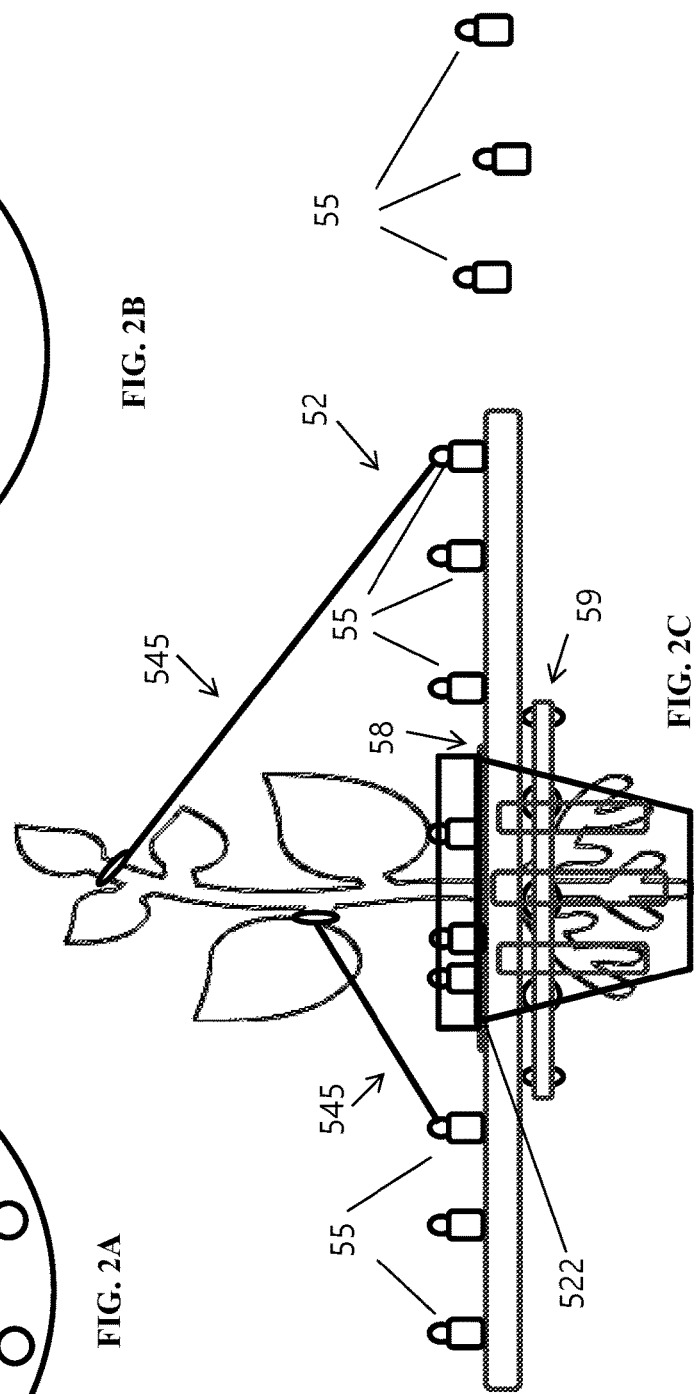
FIG. 2C illustrates a side view of the tabletop 52 embodiment wherein a netpot 522 with a plant therein is received within the tabletop pot aperture 58.
Figure 3:
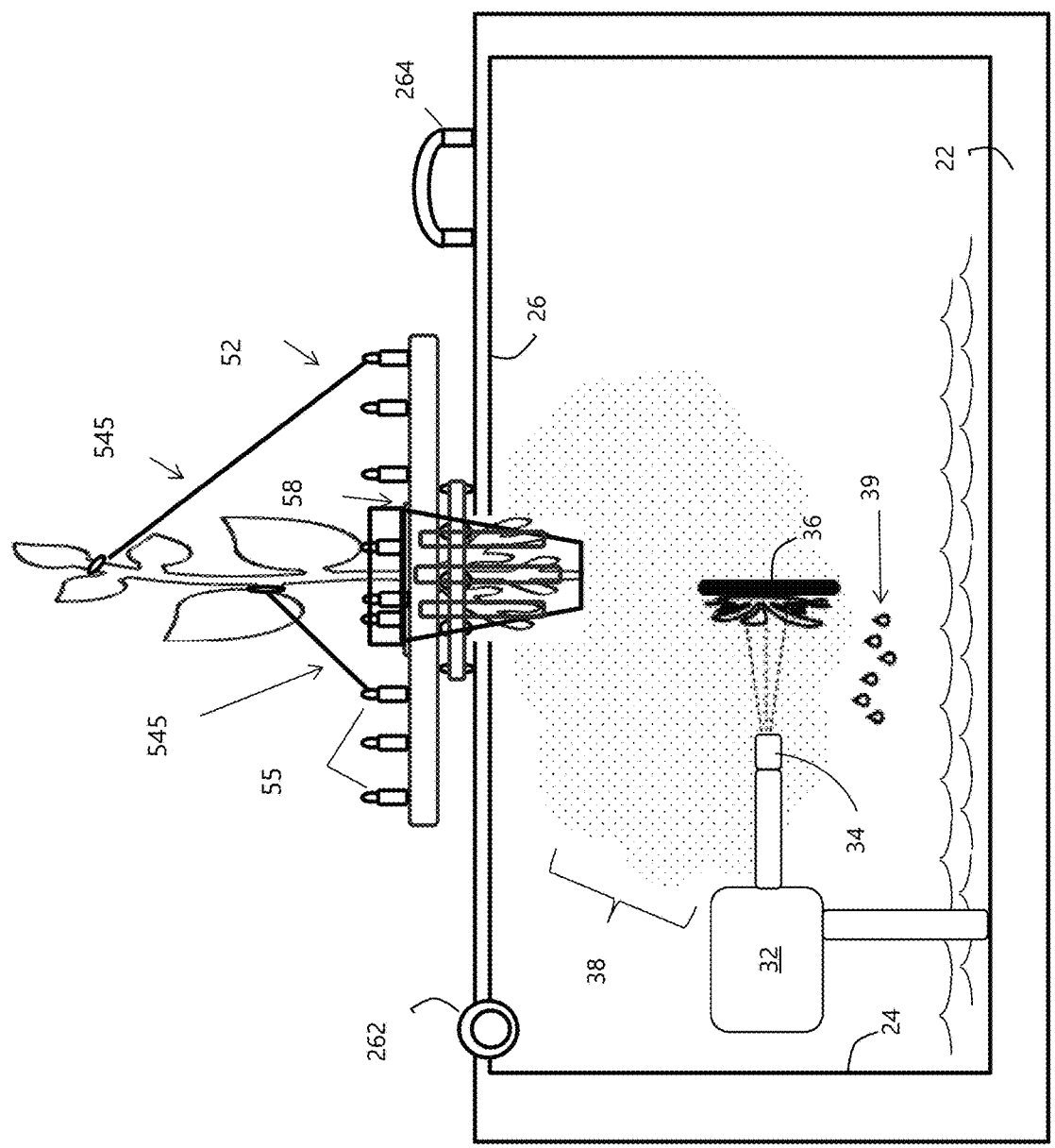
FIG. 3 illustrates an embodiment of the tabletop 52 wherein the bottom surface rests upon a rotatable mechanism such as a rotatable ring 59, (or turntable, Lazy-Susan, or carousel with inner aperture adapted to receive a net pot 522), that is interposed between the tabletop 52 bottom surface and another surface which may be the top surface of an enclosure 20 (such as in FIG. 1) and wherein the rotatable ring 59 enables relative rotation between the tabletop 52 bottom surface and the top surface of the enclosure 20.

The enclosure 20 may be used in conjunction with a plant care device, as illustrated in FIGS. 2A-2C. The plant care device may comprised of a ring and a substantially flat surface, the ring positioned substantially horizontally to and within the surface, the ring functionally coupled to the substantially flat surface by an annular rotation device that enables annular relative rotation between the ring and the substantially flat surface; the substantially flat surface configured to receive a plurality of tie-down-anchors. In use, a plant with roots and a plurality of stems is receivable in a net pot, the roots and a portion of the net pot receivable through the ring, and the plurality of stems are respectively securable to the tie-down anchors. The annular rotation device may be selected from a Lazy-Susan, a carousel, and a swivel turntable, or other equivalent devices that enable relative annular rotation between adjacent structures. The substantially flat surface may include or be comprised of sheet, layer, or portions of magnetic material and configured to receive a plurality of tie-down-anchors that are comprised of a ferromagnetic material. Alternatively, the substantially flat surface may be comprised of magnetic material and the plurality of tie-down-anchors may be comprised of ferromagnetic material.

With reference to the illustrated embodiment, the trimming table is comprised of a rotatable tabletop 52 and a plurality of removably securable tie-down anchors 55 that are securable around the tabletop 52 and onto which plant stems may be removably secured. The removably securable tie-down anchors 55 may be secured to the tabletop 52 by a variety of components or structures that enable the removably securable tie-down anchors 55 to be removably secured to the tabletop 52. In a first preferred embodiment in FIG. 2B, the tabletop 52 includes a sheet or layer of a ferromagnetic material 51 that inherently, due to its physical properties, is attracted to one or more magnetic fields, such as from permanent magnet material, and magnetic material may be incorporated into the tie-down anchors 55, or alternatively a sheet or layer of permanent magnet material 51 that is magnetically attracted to tie-downs anchors 55 including a sufficient ferromagnetic metal content and may be used. In a second embodiment in FIG. 2A, the an inherently magnetically attractive material such as ferromagnetic metal surfaces 54 are distributed on the tabletop 52 and the plurality of tie-downs 55 are comprised of a sufficient permanent magnet material that enables the tie-downs 55 to be removably attachable thereto (or vice versa), each of which may be removably securable to one of the plurality of metal surfaces 54 on the table top and wherein a plant stem may be secured by a line or wire 545 between a plant stem and one of the plurality of magnets 55 that is secured to one of the plurality of metal surfaces 54. Alternative removably attachable structures such as hook-and-loop fasteners or rings and hooks may also be employed as equivalents. The tabletop 52 further includes a tabletop pot aperture 58 that is configured to receive a net pot 522 diameter and restrict the lip or other larger diameter of the net pot so as to suspend or support the net pot as substantially received within the tabletop pot aperture 58.

In a preferred embodiment, the tabletop 52 is configured or configurable for rotation of the tabletop 52 and tabletop pot aperture 58 relative to a second surface or structure that supports the tabletop 52, and that is preferably, but not necessarily, fixed relative to the user. In one preferred embodiment, the tabletop 52 bottom surface rests upon, rotatable mechanism such as a rotatable ring 59, (or turntable, Lazy-Susan, or carousel with inner aperture adapted to receive a net pot), that is interposed between the tabletop 52 bottom surface and the second surface (not shown), wherein the rotatable ring 59 enables relative rotation between the tabletop 52 bottom surface and the second surface or structure. For the purposes of this description, a turntable, Lazy-Susan, or carousel includes all designs comprising rotating adjacent surfaces that enable relative rotational movement between two horizontal surfaces. In another embodiment, the tabletop 52 is comprised of at least an inner and outer rings with bearings or a slippery surface interposed between the inner and outer rings so that the inner ring is configured for rotation relative to the inner ring. Moreover, the inner ring may have stand-offs so that it the inner ring may support the tabletop 52 upon a fixed flat surface and allow the inner and outer rings to rotate to facilitate trimming of a plant in the tabletop 52. The tabletop 52 is capable of 360-degree rotation and in use, the tabletop 52 may be rotated in either direction for 360 degrees or further. The rotatable mechanism facilitates rotation of the tabletop 52 and plant received within the tabletop pot aperture 58 to rotate relative to the second surface or structure or a user fixed relative to the second surface or structure and enables the user to rotate the tabletop 52 and plant positioned therein and enable the users' positionally fixed access to all sides of the plant leaves and stems while attending to the plant and during an activity such as trimming of the plant leaves and stems. In an alternate embodiment, the tabletop 52 further comprises an inner diameter and outer diameter table portions that are rotatably related to each other such as by wheels, rollers, bearings, slippery surfaces between the inner and outer portions, or any equivalent device, design, that enables relative rotation between the inner and outer portions.

The invention claimed is:

1. A plant care apparatus, comprised of:
    a tabletop with a tabletop pot aperture positioned substantially centrally to the tabletop, the tabletop comprised of a tabletop top surface and a tabletop bottom surface;
    a plurality of removably connectable tie-downs distributed on the tabletop around the pot aperture, and
    a rotation ring comprised of a ring platform and a rotation means, the ring platform adapted to encircle and contact the tabletop around the tabletop pot aperture, the rotation means adapted for rotation of the ring platform relative to the rotation means;
    wherein the tabletop may be positioned on the ring platform and the rotation means positioned on a first surface and the tabletop is rotatable relative to the first surface.

2. The apparatus in claim 1 wherein,
    the removably connectable tie-downs comprise a ferromagnetic material.

3. The apparatus in claim 1 wherein,
    the tabletop includes ferromagnetic material.

4. The apparatus in claim 1 wherein,
    the rotation means is selected from wheels and bearings.

5. The apparatus in claim 1 wherein,
    the rotation ring comprises a rotatable ring.

6. The apparatus in claim 1 wherein,
    the first surface is comprised of a table with a table pot aperture, the rotation ring positioned on the table pot aperture, the tabletop pot aperture aligned with the table pot aperture.

7. The apparatus in claim 1 further comprising,
    an enclosure with a top wall and an enclosure pot aperture in the top wall, the first surface comprises the top wall, the rotation ring positioned around the enclosure pot aperture, the tabletop pot aperture positioned on the enclosure pot aperture.

8. The device in claim 1 wherein,
the tabletop comprises a substantially flat surface.

9. The device in claim 8 wherein,
the tabletop includes material selected from magnetic or ferromagnetic.

10. The device in claim 1 wherein,
the tie-downs comprise a structure selected from a ring and hook.

11. The device in claim 1 wherein,
the tie-downs include material selected from magnetic or ferromagnetic material.

12. A plant care apparatus, comprised of:
a tabletop with a tabletop pot aperture positioned substantially centrally to the tabletop, the tabletop comprised of a tabletop top surface and a tabletop bottom surface;
a plurality of tie-downs that are removably connectable to the tabletop around the pot aperture, the tie-downs include material selected from magnetic and ferromagnetic material, and
a rotation ring comprised of a ring platform and a rotation means, the ring platform adapted to encircle the tabletop pot aperture;
wherein the tabletop may be positioned on the ring platform and the tabletop is rotatable relative to the tabletop top surface.

* * * * *